United States Patent
Suzuki et al.

(10) Patent No.: US 8,003,721 B2
(45) Date of Patent: Aug. 23, 2011

(54) ALIPHATIC POLYESTER COMPOSITION AND METHOD FOR PRODUCING THE SAME

(75) Inventors: Yoshinori Suzuki, Iwaki (JP); Kazuyuki Yamane, Iwaki (JP); Hiroyuki Sato, Tokyo (JP); Takahiro Watanabe, Iwaki (JP)

(73) Assignee: Kureha Corporation, Tokyo (JP)

( * ) Notice: Subject to any disclaimer, the term of this patent is extended or adjusted under 35 U.S.C. 154(b) by 352 days.

(21) Appl. No.: 12/308,891

(22) PCT Filed: Jun. 28, 2007

(86) PCT No.: PCT/JP2007/063014
§ 371 (c)(1),
(2), (4) Date: Dec. 29, 2008

(87) PCT Pub. No.: WO2008/004490
PCT Pub. Date: Jan. 10, 2008

(65) Prior Publication Data
US 2009/0275692 A1    Nov. 5, 2009

(30) Foreign Application Priority Data
Jul. 7, 2006   (JP) .................................. 2006-188004

(51) Int. Cl.
*C08K 5/52* (2006.01)
*C08K 5/5357* (2006.01)
*C08L 67/04* (2006.01)
*C08G 63/06* (2006.01)

(52) U.S. Cl. ........ 524/117; 524/120; 524/127; 524/128; 524/539; 528/271; 528/354

(58) Field of Classification Search .................. 524/117, 524/120, 127, 128, 539; 528/271, 543, 354
See application file for complete search history.

(56) References Cited

U.S. PATENT DOCUMENTS
7,538,178 B2 *   5/2009   Sato et al. ..................... 528/272
2005/0244606 A1  11/2005  Egawa
2008/0249227 A1* 10/2008  Ueda et al. .................... 524/492

FOREIGN PATENT DOCUMENTS
| CN | 1665883 A | 7/2003 |
| EP | 1 553 139 A1 | 7/2003 |
| JP | 09-111107 | 10/1995 |
| JP | 09-157408 | 12/1995 |
| JP | 2003-183934 | 12/2001 |
| JP | 2005-146274 | 10/2004 |
| JP | 2007-099861 | 10/2005 |
| KR | 10-2005-0025593 | 1/2005 |
| WO | WO 2004/005400 A1 | 7/2003 |

OTHER PUBLICATIONS

International Search Report of PCT/JP2007/063014 mailed Sep. 25, 2007.

* cited by examiner

*Primary Examiner* — Tae H Yoon
(74) *Attorney, Agent, or Firm* — Wenderoth, Lind & Ponack, L.L.P.

(57) ABSTRACT

Polyglycolic acid and polylactic acid having a weight-average molecular weight of at most 50,000 are melt-kneaded in the presence of a thermal stabilizer to obtain a polyglycolic acid-based aliphatic polyester composition. The aliphatic polyester composition alleviates the too fast crystallizability of polyglycolic acid which has been problematic in forming or molding of polyglycolic acid alone or in combination with another thermoplastic resin, thus showing a crystallization speed which has been lowered and can be controlled in a wide range.

13 Claims, No Drawings

US 8,003,721 B2

ALIPHATIC POLYESTER COMPOSITION AND METHOD FOR PRODUCING THE SAME

TECHNICAL FIELD

The present invention relates to an aliphatic polyester composition improved in crystallization property and a process for production thereof.

An aliphatic polyester, such as polyglycolic acid or polylactic acid, can be decomposed by microorganisms or enzymes present in nature, such as soil or sea water, and is therefore noted as a biodegradable polymer material giving little load to the environment. Further, an aliphatic polyester has degradability and absorbability in vivo, so that it is used also as a polymer material for medical use, such as sutures for surgery or artificial skin.

Among the aliphatic polyesters, polyglycolic acid is excellent in gas barrier properties, such as oxygen gas barrier property, carbon dioxide gas barrier property and water vapor barrier property, and also is excellent in heat resistance and mechanical properties, and therefore the development of new use thereof by itself or as a composite material together with another resin material, is under way.

However, polyglycolic acid is hydrolyzable, and is therefore expected to be combined (e.g., laminated) with another thermoplastic resin material rather than being used by itself so as to improve the properties thereof including moisture resistance (resistance to hydrolysis). On the other hand, polyglycolic acid shows fast crystallizability and is therefore liable to cause problem in shapability or product appearance, such as failure in stable stretching, thickness irregularity in the shaped product or opacification (whitening) of the shaped product, etc., due to crystallization of polyglycolic acid in the case of shaping in combination with another thermoplastic resin.

As for the problems arising from excessively large crystallization speed of polyglycolic acid, there has been proposed a method of heat-treating (imparting a thermal history to) polyglycolic acid at a temperature (a thermal history temperature) substantially higher than the melting point to retard the crystallization (Patent document 1 below). However, this method alone is not sufficient for compatibility with a wide range of materials due to a limitation of other thermoplastic resin materials combined therewith.

As another method of lowering the crystallization speed, there has been known copolymerization of introducing another component other than the main component of a crystalline polymer into the main chain thereof. Also with respect to polyglycolic acid, the lowering in crystallization speed thereof has been realized by co-polymerization of glycolide as the starting monomer with a co-monomer selected from a group of other monomers copolymerizable with glycolide (Patent document 2 below). However, the reforming of polyglycolic acid by copolymerization is accompanied with a problem that the copolymerization velocity is remarkably lowered than the velocity of homo-polymerization of glycolic acid (e.g., the copolymerization velocity of glycolic acid/lactic acid=95/5 (by weight) is lowered to ca. 1/3 of the homo-polymerization velocity of glycolic acid and a larger proportion of lactic acid will further lower the copolymerization velocity until the copolymerization per se becomes substantially impossible). Further, in the case of bulk polymerization, along with the lowering in the crystallization speed of the product copolymer, the time for recovering the solid copolymer is increased to lower the productivity. Accordingly, in the case of glycolic acid/lactic acid copolymerization, it is substantially difficult to obtain a copolymer containing more than 50 wt. % of lactic acid units.

On the other hand, it may be possible to conceive of modifying the crystallization property by polymer blending. For example, it has been known that melt-kneading of polyethylene terephthalate (PET) and polyethylene naphthalate (PEN) having analogous molecular structures cause mutual dissolution on a molecular level to result in a partially co-polymerized structure. Accordingly, also the present inventors have tried polymer blending of polyglycolic acid and polylactic acid by melt-kneading. However, even in the case of addition of polylactic acid in a small amount, clear phase separation was confirmed in the melt-kneaded product, thus failing to provide a transparent sheet product (Refer to Comparative Example 1 appearing hereinafter).

Incidentally, there has been proposed a degradable polymer composition obtained by reforming of an aliphatic polyester by blending with a modifier agent mutually soluble therewith (Patent document 3 below), but the disclosure was substantially limited to reforming (plasticization) of polylactic acid by blending with various modifier agents, and substantially no disclosure was made with respect to reforming, particularly improvement in crystallization characteristic, of polyglycolic acid.

Patent document 1: WO2003/037956A1
Patent document 2: WO03/099562A1
Patent document 3: JP3037431B

DISCLOSURE OF INVENTION

Accordingly, a principal object of the present invention is to provide a polyglycolic acid-based aliphatic polyester composition having alleviated too fast crystallization speed (or having lowered the crystallization speed) of polyglycolic acid which has been problematic in shaping thereof alone or in combination (e.g., lamination) with another thermoplastic resin, and a process for production thereof.

As a result of the present inventors' study with the above-mentioned object, it has been discovered that by melt-kneading of polyglycolic acid and polylactic acid having a weight-average molecular weight of at most 50,000 in the presence of a thermal stabilizer, the polyglycolic acid and polylactic acid are well dissolved with each other to result in a polyglycolic acid-based aliphatic polyester composition having effectively lowered the crystallization speed of the polyglycolic acid. The decrease in the crystallization speed can be conveniently confirmed by an elevation of crystallization temperature Tc1 that is defined as a peak-top temperature of a heat evolution peak accompanying a crystallization in the course of heating at a temperature-raising rate of 10° C./min. by means of a differential scanning calorimeter (DSC).

The process for producing an aliphatic polyester composition of the present invention is based on the above discovery, and the aliphatic polyester composition of the present invention thus obtained is characterized as a melt-kneaded product of polyglycolic acid and polylactic acid having a weight-average molecular weight of at most 50,000 in mixture with a thermal stabilizer.

BEST MODE FOR PRACTICING THE INVENTION

Hereinafter, the present invention will be described in the order of the steps in the process for producing an aliphatic polyester composition according to the present invention.

(Polyglycolic Acid)

As polyglycolic acid (hereinafter sometimes referred to as "PGA"), homopolymer of glycolic acid (including a ring-opening polymerization product of glycolide (GL) that is a bimolecular cyclic ester of glycolic acid) consisting only of glycolic acid-recurring unit represented by formula of —(O.CH$_2$.CO)—, is most preferred, but a glycolic acid copolymer including up to ca. 5 wt. % of polymerized units of a comonomer, other than the above-mentioned glycolic acid recurring unit, can also be used. The use of a glycolic acid copolymer containing a large amount of comonomer units is adverse to the object of the present invention and is not preferred.

Examples of comonomers for providing the polyglycolic acid copolymer together with the glycolic acid monomer such as glycolide, may include: cyclic monomers, inclusive of ethylene oxalate (i.e., 1, 4-dioxane-2,3-dione); lactides; lactones, such as β-propiolactone, β-butyrolactone; pivalolactone, γ-butyrolactone, δ-valerolactone, β-methyl-δ-valerolactone, and ε-caprolactone; carbonates, such as trimethylene carbonate; ethers, such as 1,3-dioxane; ether-esters, such as dioxanone; and amides, such as ε-caprolactam; hydroxycarboxylic acids, such as lactic acid, 3-hydroxypropanoic acid, 4-hydroxybutanonic acid and 6-hydroxycaproic acid, and their alkyl esters; substantially equal molar mixtures of aliphatic diols, such as ethylene glycol and 1,4-butane diol with aliphatic dicarboxylic acids, such as succinic acid and adipic acid, and their alkyl or aromatic esters; and two or more species of these. These monomers may be replaced by polymers thereof which can be used as a starting material for providing a polyglycolic acid copolymer together with the above-mentioned glycolic acid monomer such as glycolide.

PGA should preferably have a molecular weight (in terms of Mw (weight-average molecular weight) based on polymethyl methacrylate as measured by GPC using hexafluoroisopropanol solvent; the same as hereinafter, unless otherwise specified) which is larger than 70,000, further preferably larger than 100,000, particularly in the range of 120,000-500,000. The present invention principally aims at providing a PGA-based aliphatic polyester composition as a forming or molding material, through melt-kneading of PGA and a low-molecular weight polylactic acid (hereinafter sometimes referred to as "PLA"), capable of providing a form product having excellent properties inclusive of strength by forming alone or in combination with another forming material. For this purpose, the resultant aliphatic polyester composition should preferably have a molecular weight which is larger than 70,000, further preferably larger than 100,000, particularly in the range of 120,000-500,000. The molecular weight of PGA used in the present invention is determined from such a viewpoint, and at 70,000 or below, it is difficult to provide a desired molecular weight of the combination through melt-kneading with a low-molecular weight PLA and also difficult to provide the formed product with a sufficient strength. On the other hand, too large a molecular weight of PGA requires a large power in melt-kneading so that the melt-kneading becomes difficult. A melt-viscosity may be used as a measure of preferred molecular weight of PGA. More specifically, PGA may preferably exhibit a melt-viscosity of 100-20000 Pa·s, more preferably 100-10000 Pa·s, particularly 200-2000 Pa·s.

For producing PGA as described above, it is preferred to adopt a process of subjecting glycolide (i.e., cyclic diester of glycolic acid) to ring-opening polymerization under heating. The ring-opening polymerization is substantially a ring-opening polymerization according to bulk polymerization. The ring-opening polymerization is generally performed at a temperature of at least 100° C. in the presence of a catalyst. In order to suppress the lowering in molecular weight of PGA during melt-kneading in the presence of a thermal stabilizer, it is preferred to suppress the residual glycolide content in the PGA used to below 0.5 wt. %, particularly below 0.2 wt. %. For this purpose, it is preferred to control the system at a temperature of below 220° C., more preferably 140-210° C., further preferably 100-190° C., so as to proceed with at least a terminal period (preferably a period of monomer conversion of at least 50%) of the polymerization in a solid phase as disclosed in WO2005/090438A, and it is also preferred to subject the resultant polyglycolic acid to removal of residual glycolide by release to a gaseous phase.

(Polylactic Acid)

In the present invention, the above-mentioned PGA and polylactic acid (PLA) having a molecular weight of at most 50000 are melt-kneaded. If the molecular weight of PLA exceeds 50000, the melt-kneaded product thereof with PGA fails to cause uniform mutual dissolution but causes phase separation in the form of sea-islands, thus failing to provide an aliphatic polyester composition showing transparence and good formability as represented by stretchability. The lower limit of PLA molecular weight is relatively less restricted from the viewpoint of melt-kneading with PGA to provide an aliphatic polyester composition with better mutual solubility, and it is possible to use so-called oligomers having a molecular weight on the order of several thousands and even possible to use lactide that is a cyclic diester of lactic acid. However, the effect of lowering the crystallization speed of PGA is primarily controlled by the amount of the added PLA and is not correspondingly increased by a lowering in the PLA molecular weight. Accordingly, as the use of a lower-molecular weight PLA results in a lowering in molecular weight of the resultant aliphatic polyester composition, it is not necessarily preferred for the object of the present invention to provide an aliphatic polyester composition having a molecular weight of at least 70000 and showing good formability. From this viewpoint, it is preferred that the PLA has a molecular weight of at least 1000, further at least 10,000 and particularly 20,000 or larger.

Such a low-molecular weight PLA can be easily produced by bulk polymerization or solution polymerization of lactide (L, D or D/L lactide) alone, a mixture of these or a mixture thereof with lactic acid. Further, a PLA having a relatively high molecular weight in the range of at most 50,000 can be easily obtained by reducing the molecular weight of a commercially available PLA having a high molecular weight (ordinarily on the order of ca. 200,000) by melt-kneading it with a molecular weight-reducing agent, such as alcohols or water.

(PGA/PLA Blend Ratio)

The present invention principally aims at improvement in the properties of PGA, including a lowering in crystallization speed, by blending a low-molecular weight PLA with the PGA. Accordingly, it is preferred that PGA occupies at least 50 wt. % of the total of the PGA and PLA. On the other hand, a significant decrease in crystallization speed represented by a significant increase (at least 2° C.) in Tc1 (crystallization temperature in the course of temperature raise) (e.g., a lowering by 3° C. of Tc1 corresponding to a decrease to ca. 2/3 of the crystallization speed) can already be exhibited by PLA blend at a level of 1 wt. % (Refer to Example 1 hereinafter). Thus, the PGA/PLA blend ratio (by weight, the same hereinafter) in the present invention is preferably 99/1-50/50. Actually, aliphatic polyester compositions which are relatively transparent and functioning as mutually soluble forming materials have been obtained in this range (Examples 1-5 hereinafter).

On the other hand, as for gas-barrier property as an important characteristic of PGA, a gas-barrier property comparable to or even better than that of MXD6 nylon (polymetaxylylene adipamide), know as a gas-barrier resin material, has been confirmed in the range of PGA/PLA=99/1-80/20, and gas-barrier property comparable to or even better than that of EVOH (ethylene-vinyl alcohol copolymer), i.e., an oxygen-transmission coefficient that is identical to or smaller than that of the latter, has been confirmed in the range of PGA/PLA=99/1-90/10.

Further to say about the effect of the PGA/PLA blend ratio on the properties of the composition, a ratio larger than 80/20 results in a slight opacity but retains a practically tolerable level of transparence, and a ratio of 50/50 results in some opacity but allows stretch-formability and provides a good moisture resistance. In the range of PGA/PLA=99/1-95/5, there has been obtained a resin composition which is not only a mutually dissolved blend showing transparence by observation with eyes but also is free from recognition of sea-islands texture even by observation through a microscope (×5000) and can be regarded as a single resin composition from morphology analyses including a DSC analysis (which may be referred to as in a perfectly mutually dissolved polymer alloy state). Also the gas-barrier property is not different from that of a GL/LA copolymer (Refer to Example 3 and Reference Example 2 hereinafter).

(Thermal Stabilizer)

In the present invention, the melt-kneading of PGA and low-molecular weight PLA is performed in the presence of a thermal stabilizer. The thermal stabilizer is added in order to suppress the molecular weight lowering of high-molecular weight PGA during the melt-kneading, and without the addition thereof, the resultant aliphatic polyester composition causes a molecular weight lowering leading to unignorable levels of lowerings in properties, such as strength even if the lowering of crystallization speed is attained by the blending of PLA.

The above-mentioned effect can be attained by mixing of the thermal stabilizer simultaneously with PGA and PLA, but it is preferred to melt-knead the thermal stabilizer with PGA to form a compound in advance of melt-kneading with PLA for the purpose of effective utilization of the thermal stabilizer.

As the thermal stabilizer, those generally used as thermal stabilizers for aliphatic polyesters may be used, but among these, it is preferred to use a phosphoric acid ester represented by formula (1) below:

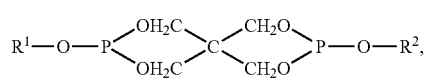

(1)

wherein $R^1$ and $R^2$ denote identical or different hydrocarbon groups; preferably both being an aryl group, particularly a phenyl group, having 1-3 alkyl substituents each having 1-12 carbon atoms (including 2,6-di-tert-butyl-4-methylphenyl group or 2,4-di-tert-butylphenyl group as a preferred example) or a long-chain alkyl group having 8-24 carbon atoms (e.g., a stearyl group); particularly preferably both $R^1$ and $R^2$ being 2,6-di-tert-butyl group or octadecyl group; or a phosphoric acid ester having at least one hydroxyl group and at least one long-chain alkyl group represented by formula (2) below:

(2)

wherein $R^3$ denotes a long-chain alkyl group having 8-24 carbon atoms (including a stearyl group as a preferred example) and n is a number giving an average of 1-2.

These thermal stabilizers may be added in an amount of 0.003-3 wt. parts, preferably 0.005-1 wt. part, further preferably 0.01-0.5 wt. part. Below 0.003 wt. part, the addition effect is scarce, and in excess of 3 wt. parts, the addition effect may be saturated and adverse effects such as deterioration of transparence of the resultant composition are liable to occur.

In the present invention, it is preferred to use such a thermal stabilizer as to provide a melt viscosity retentivity of at least 70% after 30 minutes at 260° C. as measured in advance by a rheometer ("ARES Rheometer", made by TA Instruments Co.)

It is also preferred to add to the aliphatic polyester composition of the present invention a carboxyl group-capping agent in addition to the above-mentioned thermal stabilizer so as to improve the moisture resistance of the resultant form product.

The carboxyl group-capping agent is considered to act on the terminal hydroxyl groups of PGA and PLA to obstruct the hydrolysis-promoting function thereof, thereby particularly improving the moisture resistance of PGA. As the carboxyl group-capping agent, it is generally possible to use compounds known as an agent for improving moisture resistance of aliphatic polyesters, such as PLA. Examples thereof may include: carbodiimide compounds inclusive of monocarbodiimides and polycarbodiimides, such as N,N-2,6-diisopropylphenylcarbodiimide; oxazoline compounds, such as 2,2'-m-phenylene-bis (2-oxazoline), 2, 2'-p-phenylene-bis (2-oxazoline), 2-phenyl-2-oxagoline, and styrene-isopropenyl-2-oxazoline; oxazine compounds, such as 2-methoxy-5, 6-dihydro-4H-1,3-oxazine; and epoxy compounds, such as N-glycidylphthalimide, cyclohexene oxide, and tris (2,3-epoxypropyl) isocyanurate. Among these, carbodiimide compounds and epoxy compounds are preferred. These carboxyl group-capping agents can be used in combination of two or more species as desired, and may preferably be used in a proportion of 0.01-10 wt. parts, further preferably 0.1-2 wt. parts, particularly preferably 0.2-1 wt. part, per 100 wt. parts of the PGA resin.

The aliphatic polyester composition of the present invention may be optionally caused to contain various additives, such as inorganic filler, photo-stabilizer, water-proofing agent, water repellant, lubricant, release agent, coupling agent, pigment, and dye, within an extent of not adversely affecting the object of the present invention. These additives may be used respectively in effective amounts depending on their respective purposes of addition.

(Melt-kneading)

The aliphatic polyester composition of the present invention may be obtained by melt-kneading the above-mentioned PGA preferably blended with the thermal stabilizer in advance, PLA and optionally added other additives.

The melt-kneading may be performed by using arbitrary apparatus capable of exerting a uniform effect of melt-kneading between PGA and low-molecular weight PLA, whereas it is preferred to use a twin-screw kneading extruder which is less liable to cause agglomeration of PLA as the minor-amount component, among melt-kneading apparatus commercially available at present.

The melt-kneading in a twin-screw kneading extruder may for example be continued for 3-60 minutes at 230-270° C., preferably at 240-260° C. for providing an aliphatic polyester composition of the present invention with good mutual dissolution between PLA and low-molecular weight PLA.

(Aliphatic Polyester Composition)

The thus-obtained aliphatic polyester composition of the present invention may be provided with characteristic properties as described in the above-mentioned section of (PGA/PLA blend ratio) by varying the PGA/PLA blend ratios.

The crystallization speed-lowering effect as a representative reforming effect may be represented by, instead of the above-mentioned increase in crystallization temperature Tc1 in the course of temperature raise, a decrease in crystallization temperature Tc2 that is defined as a peak-top temperature of a heat-evolution peak accompanying a crystallization in the course of cooling at a temperature-lowering rate of 10° C./min. similarly by means of a scanning calorimeter (DSC).

Compared with PGA, the aliphatic polyester composition of the present invention shows a higher Tc1 of at least 96° C. and may result in a state where Tc1 cannot be measured due to the absence of a crystallization peak at an increased PLA blend ratio. Even in the range of PGA/PLA=99/1-95/5, there has been obtained a result that Tc1 is increased by 3-19° C. and Tc2 is decreased by 9-35° C. This means that the crystallization speed is lowered to ca. 2/3-1/10 of that of PGA alone, leading to a remarkably increased formability as represented by remarkable suppression of whitening during forming even in the case of forming of the composition alone, and further easy accomplishment of composite forming with a wide range of thermoplastic resins having a diversity of thermal properties also in the case of composite forming (e.g., lamination) with another thermoplastic resin. Also in the range of PGA/PLA in excess of 95/5 and up to 50/50, a further improvement in formability and an improvement in moisture resistance can be attained.

By utilizing the crystallization speed which is lower than that of PGA and can be controlled in a wide range, the aliphatic polyester composition of the present invention can be applied to a diversity of forming or molding processes by itself or in combination with another thermoplastic resin material.

They may for example include the roll process, tenter process and inflation process for forming into films or sheets, the filament forming process, the injection molding into various shapes, etc.

By utilizing the crystallization speed that can be controlled in a wide range, the aliphatic polyester composition of the present invention may particularly suitable be applied to composite forming with other thermoplastic resin materials showing a diversity of crystallization speeds or melt-solidification characteristics. The forms of composite products may include: laminate films or sheets, core-sheath type laminate or co-injection molding products including a layer, preferably an inner layer or a core layer, of the aliphatic polyester composition of the present invention Examples of such another thermoplastic resin material forming a composite product together with the aliphatic polyester composition of the present invention may include: polyolefin, polyester, polystyrene, polyvinyl chloride, polycarbonate, polylactic acid, polysuccinic acid ester, polycaprolactone, polyamide, ethylene-vinyl alcohol copolymer (EVOH), polyvinylidene chloride (PVDC), etc.

The crystallization speed that is lowered and can be controlled in a wide range of the aliphatic polyester composition of the present invention may provide very suitable formability not only in melt-forming but also in secondary forming accompanied with stretching of the composition alone or a composite product thereof.

EXAMPLES

Hereinbelow, the present invention will be described more specifically based on Examples and Comparative Examples. The physical properties (or values) described in the present specification including the following description are based on those measured according to the following methods.

(1) Glycolide Content

To ca. 100 mg of a sample PGA resin (composition), 2 g of dimethyl sulfoxide containing 4-chlorobenzophenone as an internal standard at a concentration of 0.2 g/l, was added, and the mixture was heated at 150° C. for ca. 5 min. to dissolve the resin and, after being cooled to room temperature, was subjected to filtration. Then, 1 μl of the filtrate solution was taken and injected into a gas chromatography (GC) apparatus for measurement. From a value obtained from the measurement, a glycolide content was calculated in terms of wt. % contained in the polymer. The GC analysis conditions were as follows:

Apparatus: "GC-2010" made by K.K. Shimadzu Seisakusho)
Column: "TC-17" (0.25 mm in diameter×30 mm in length).
Column temperature: Held at 150° C. for 5 min., heated at 270° C. at a rate of 20° C./min. and then held at 270° C. for 3 min.
Gasification chamber temperature: 180° C.
Detector: FID (hydrogen flame ionization detector) at temperature of 300° C.

(2) Weight-average Molecular Weight

A GPC apparatus ("Shodex GPC-104", made by Showa Denko K.K.) was used together with two columns ("HFIP-606M", made by Showa Denko K.K.) connected in series. The measurement was performed at 40° C. by flowing a 5 mmol/dm$^3$-conc. sodium trifluoroacetate in hexafluoroisopropanol (HFIP) as the solvent at a flow rate of 0.6 ml/min.

(3) Tc1, Tc2

A sample at 2 g was formed into an amorphous press sheet through a process of 3 min. of pre-heating at 280° C. and 1 min. of pressing under a pressure of 5 MPa by means of a heat press machine ("AF-50", made by K.K. Shintoh Kinzoku Kogyosho) set at 280° C., followed by quenching in an iced-water bath controlled at below 5° C. The amorphous press sheet was subjected to measurement by using a differential scanning calorimeter (DSC) ("TC10A", made by Mettler Instrument A. G) of Tc1 as a peak-top temperature of a heat evolution peak in the course of heating at a temperature raise rate of 10° C./min., and Tc2 as a peak-top temperature of a heat evolution peak in the course of cooling at a temperature decrease rate of 10° C./min.

(4) MV (Melt Viscosity) Retentivity 2 g of a PGA sample (containing a thermal stabilizer as the case may be) was charged in a rheometer ("ARES Rheometer", made by TA Instruments Co.) and subjected to a continual measurement of melt-viscosity for 30 min. at 260° C. in an $N_2$ atmosphere, whereby an MV-retentivity (%) was calculated as a ratio of a melt viscosity after lapse of the 30 min. to a melt-viscosity at the initial stage.

(5) Transparence

The transparence of a block after melt-kneading or a block of polymerizate was formed into an amorphous press sheet similar to the above-mentioned one used for measurement of Tc1, etc., and the press sheet was observed with eyes to judge the transparence.

(6) Yellowness (YI Value)

A colorimeter ("Color Analyzer TC-1800MKII", made by K.K. Tokyo Denshoku) was used, and a sample was placed on a Petri dish for the meter to measure a YI value. For the measurement, standard light C was used to measure a reflected light at 2 degrees, thereby obtaining an average of 3-times measured values. A smaller YI value represents a less coloring (a lower yellowness).

(7) Moisture Resistance

An amorphous press sheet was heat-treated for 30 min. at 30° C. to provide a sheet, which was then held for 5 days in an environment of 50° C./90% RH to calculate a molecular weight retentivity (%) according to a formula below based on the molecular weight change before and after the holding.

Molecular Weight Retentivity (%)=((weight-average molecular weight after the holding)/(weight-average molecular weight before the holding))×100.

(8) Gas-barrier Property

An oxygen gas permeability of an amorphous press sheet was measured in an environment of 23° C./90% RH by using an oxygen gas permeability meter ("OX-TRAN 2/21", made by Mocon Co.) and normalized at a thickness of 20 μm to provide an oxygen gas permeability in the unit of cc/m$^2$/day/atm.

(9) Press-formability

A sample at 2 g was subjected to sheet forming under the conditions of 3 min. of pre-heating at 80° C. and then 1 min. of pressing under a pressure of 5 MPa by using a heat press machine ("AF-50", made by K.K. Shintoh Kinzoku Kogyosho), whereby a sample having allowed the sheet forming was judged as "A", and a sample having given a product that failed to show a strength or failed to retain a sheet form due to fragility was judged as "C".

(10) Stretchability

An amorphous sheet (measuring: ca. 200 mm in diameter× 100 μm in thickness) prepared in the above-described manner was set in a simple-type blow molding machine, and subjected to 1 min. of pre-heating at 70° C. and then subjected to balloon stretching by blowing with $N_2$ in an $N_2$ atmosphere to evaluate the balloon-stretchability, whereby a sample having allowed the balloon stretching was judged as "A", and a sample having caused puncture during the blowing or having resulted in a formed film with a remarkable thickness irregularity (clearly noticeable by touching with a hand) was judged as "C".

(Preparation of Starting PGA Materials)

Each of three types of PGA solid pulverized products each obtained through bulk polymerization was dry-blended with a mono- and di-stearyl acid phosphate equi-molar mixture ("AX-71", made by Asahi Denka Kogyo K.K.) in an amount of 300 ppm with respect to PGA, and the blend was melt-kneaded to form a compound through a twin-screw extruder ("LT-20", made by K.K. Toyo Seiki; at cylinder set temperatures C1/C2/C3/D=220/235/240/230° C.). The melt strand was withdrawn, solidified on a cooling roller and cut into pellets by means of a pelletizer to recover 3 types of starting PGA materials A, B and C showing different molecular weights (Mw) shown in Table 1 below.

(Preparation of Starting PLA Materials)

Pellets of PLA product ("LACTI#9400", made by K.K. Shimadzu Seisakusho; weight-average molecular weight (Mw)=213,000, number-average molecular weight=121,000) were separately blended with 3 different amounts of 1-dodecyl alcohol and respectively melt-kneaded to form compounds through a twin-screw extruder ("LT-20", made by K.K. Toyo Seiki; at cylinder set temperatures C1/C2/C3/D=220/235/240/230° C.). The melt strands were withdrawn, solidified on a cooling roller and cut into pellets by means of a pelletizer, thereby obtaining 4 types of starting PLA materials D-G (including the commercial product pellets as "F").

TABLE 1

| Starting material | Polymer species | Details |
|---|---|---|
| A | PGA | Mw = 236400, AX-71 = 300 ppm |
| B | PGA | Mw = 368900, AX-71 = 300 ppm |
| C | PGA | Mw = 213500, AX-71 = 0 ppm |
| D | PLA | Mw = 40600 |
| E | PLA | Mw = 18200 |
| F | PLA | Mw = 213000 |
| G | PLA | Mw = 52000 |

Example 1

29.7 g of PGA pellets (Material A) and 0.3 g of PLA pellets (Material D) were dry-blended and charged all together into a biaxial kneading mill ("LABOPLAST MILL", made by K.K. Toyo Seiki) set at 240° C. and melt-kneaded. After 10 minutes, the polymer product was withdrawn in a molten state. The recovery rate was nearly 100%.

A portion of the molten-state product was sampled in a metal frame to form a plate (measuring: 30 mm×30 mm×2 mm). The plate exhibited a YI of 18, and no coloring of the product was recognized.

Then, the product was subjected to 3 min. of preheating at 280° C. and 1 min. of pressing under 5 MPa in a heat press machine ("AF-50", made by K.K. Shintoh Kinzoku Kogyosho) set at 280° C., followed by quenching to form a press sheet (measuring: 150 mm×150 mm×100 μm). The resultant sheet was transparent and no phase separation was recognized. The sheet was subjected to DSC measurement to show Tc1=96° C. and Tc2=137° C., that is, a higher Tc1 and a lower Tc2 than PGA homopolymer (Tc1=93° C. and Tc2=146° C. as shown in Reference Example 1 hereinafter), whereby a slower crystallization speed was confirmed.

Further, as a result of measurement by an oxygen transmission meter, the sheet exhibited an oxygen transmission rate ($O_2$TR) of 2.55 cc/m$^2$/day/atm at a conversion thickness of 20 μm.

Further, as a result of blowing in a simple-type blow molding machine after 1 min. of preheating at 70° C., the sheet could be formed into a stretched film.

Example 2

The melt-kneading and evaluation of the product was performed in the same manner as in Example 1 except that the charge stocks were changed to 29.4 g of PGA Material A and 0.6 g of PLA Material D.

The resultant press sheet was subjected to a moisture resistance test including 30 min. of heat treatment at 80° C. and 5 days of holding in an environmental tester regulated at 50° C./90% RH, whereby a molecular weight-retentivity of 19% was exhibited.

Example 3

The melt-kneading and evaluation of the product was performed in the same manner as in Example 1 except that the charge stocks were changed to 28.5 g of PGA Material A and 1.5 g of PLA Material D, and the kneading time was changed to 15 min.

As a result of observation of the press sheet through an electron microscope (SEM), a state of mutual dissolution was confirmed with no recognition of phase separation (sea-islands texture).

Example 4

The melt-kneading and evaluation of the product was performed in the same manner as in Example 1 except that the charge stocks were changed to 28.5 g of PGA Material A and 1.5 g of PLA Material E, and the melt-kneading was performed at an average residence time of 10 min. through a twin-screw extruder ("LT-20", made by K.K. Toyo Seiki) set at cylinder temperature of 220° C./235° C./240° C./230° C.

Example 5

The melt-kneading and evaluation of the product was performed in the same manner as in Example 1 except that the charge stocks were changed to 24 g of PGA Material A and 6 g of PLA Material D, and the kneading time was changed to 30 min.

Example 6

The melt-kneading and evaluation of the product was performed in the same manner as in Example 1 except that the charge stocks were changed to 15 g of PGA Material B and 15 g of PLA Material D, and the kneading time was changed to 30 min.

Comparative Example 1

28.5 g of PGA pellets (Material A) and 1.5 g of PLA pellets (Material F) were dry-blended and charged all together into "LABOPLAST MILL", set at 240° C. and melt-kneaded. After 60 minutes, the polymer product was withdrawn in a molten state. The recovery rate was nearly 100%.

A portion of the molten-state product was sampled in a metal frame to form a plate. The plate exhibited a YI of 22, and no coloring of the product was recognized.

Then, the product was subjected to pressing under in the heat press machine set at 280° C., followed by quenching to form a press sheet. The resultant sheet was opaque.

As a result of observation of the electron microscope (SEM), phase separation (sea-islands texture) was observed.

The sheet was subjected to DSC measurement to show Tc1=94° C. and Tc2=144° C., thus confirming almost identical crystallization speed as PGA homopolymer.

Further, as a result of blowing in a simple-type blow molding machine after 1 min. of preheating at 70° C., the sheet caused a puncture at a low stretch ratio, thus failing to provide a stretched film.

Comparative Example 2

The melt-kneading and evaluation of the product was performed in the same manner as in Example 3 except that PGA Material C (containing no thermal stabilizer) was used instead of PGA Material A.

A portion of the molten-state product was sampled in a metal frame to form a plate. The plate exhibited a YI of 43, and the product was colored.

Then, the product was subjected to the pressing in the heat press machine set at 280° C. but failed to provide a sheet due to severe deterioration.

Comparative Example 3

The melt-kneading and evaluation of the product was performed in the same manner as in Example 3 except that PLA Material G (Mw=52000) was used instead of PLA Material D.

A portion of the molten-state product was sampled in a metal frame to form a plate. The plate exhibited a YI of 24, and no coloring of the product was recognized.

Then, the product was subjected to the pressing in the heat press machine set at 280° C. and quenched to form a press sheet. The resultant sheet was opaque and caused phase separation.

Further, when the sheet was set in the simple-type blow molding machine and subjected to blowing after 1 min. of preheating at 70° C., the sheet caused a puncture at a low stretch ratio, thus failing to provide a stretched film.

Reference Example 1

Bulk homo-polymerization of glycolide (GL) was performed in 7 hours at 170° C. in the presence of 30 ppm of tin dichloride.

Reference Example 2

Bulk copolymerization of glycolide (GL)/lactide (LA) =95/5 (by weight) was performed in 24 hours at 170° C. in the presence of 30 ppm of tin dichloride.

Reference Example 3

Into a stirring vessel-type reactor kept in a nitrogen atmosphere and set at a jacket temperature of 180° C., a polymerization feed in a molten liquid state including an equi-molar mixture of glycolide (GL) and lactide (LA) and 1-dodecanol at a 0.3 mol % with respect to the mixture, was continuously supplied at a rate of 3 kg/h together with a 0.015 g/ml —solution of tin dichloride in ethyl acetate at a rate of 1 ml/min so as to provide 300 ppm of tin dichloride with respect to the mixture.

While the supply of the polymerization feed was continued under stirring, a molten liquid of the reaction mixture was withdrawn from the discharge port of the reactor at a rate of 3 kg/h so as to provide an average residence time of 5 min., and continuously supplied to a horizontal twin-screw reactor provided with 4 divisions of jacket set at temperatures of 170° C., 185° C., 200° C. and 215° C., respectively.

While the supply of the molten liquid was continued under stirring, a molten liquid of the reaction mixture was withdrawn from the discharge port of the reactor at a rate of 3 hg/h so as to provide an average residence time of 10 min., and continuously supplied to a horizontal twin-screw reactor set at a jacket temperature of 50° C. While the supply of the molten liquid was continued, it was tried to withdraw the reaction mixture in a solid state, whereas the reaction mixture was not solidified sufficiently but was discharged in a liquid state and a recovered at a rate of 85% due to adhesion to the apparatus.

The outlines of the above-described melt-kneading (Examples, Comparative Examples) and polymerization (Reference Examples), and also the evaluation results of the products, are inclusively shown in the following Table 2.

TABLE 2

| | | | Example | | | | | | | |
|---|---|---|---|---|---|---|---|---|---|---|
| | | | 1 | 2 | 3 | 4 | 5 | 6 | Comp. 1 |
| Composition | PGA/PLA | w/w | 99/1 | 98/2 | 95/5 | 95/5 | 80/20 | 50/50 | 95/5 |
| PGA Material | Mw | — | 236400 | 236400 | 236400 | 236400 | 236400 | 368900 | 236400 |
| | Thermal stabilizer | ppm | 300 | 300 | 300 | 300 | 300 | 300 | 300 |
| | MV retentivity | % | 81 | 81 | 81 | 81 | 81 | 75 | 81 |
| PLA Material | Mw | — | 40600 | 40600 | 40600 | 18200 | 40600 | 40600 | 213000 |
| Kneading or | Apparatus[*1] | — | LPM | LPM | LPM | LT-20 | LPM | LPM | LPM |
| reaction | Temperature | °C. | 240 | 240 | 240 | 240 | 240 | 240 | 240 |
| conditions | Time | min | 10 | 10 | 15 | 10 | 20 | 30 | 60 |
| Product | Recovery rate | % | 100 | 100 | 100 | 100 | 100 | 100 | 100 |
| | Tranparence | — | clear | clear | clear | clear | clear[*3] | clear[*4] | opaque |
| | Coloring(YI) | — | 18 | 18 | 20 | 20 | 20 | 0 | 22 |
| | Mw | — | 234500 | 232400 | 225200 | 224300 | 200120 | 213300 | 170200 |
| Formability | Press | — | A | A | A | A | A | A | A |
| | Stretching | — | A | A | A | A | A | A | C |
| | Formed product | — | clear | clear | clear | clear | clear | clear | — |
| Morphology | SEM picture | — | — | — | Dissolved | — | — | — | Sea-islands |
| Crystal temp. | Tc1 | °C. | 96 | 102 | 112 | 111 | 133 | ND[*2] | 94 |
| | Tc2 | °C. | 137 | 128 | 111 | 113 | ND[*2] | ND[*2] | 144 |
| Moist resistance | Mw retention | % | — | 19 | 21 | 21 | 28 | 40 | — |
| Gas-barrier | O$_2$ TRAN | *5 | 2.55 | 2.62 | 3.55 | — | 1.98 | — | — |

| | | | Example | | | | |
|---|---|---|---|---|---|---|---|
| | | | Comp. 2 | Comp. 3 | Ref. 1 | Ref. 2 | Ref. 3 |
| Composition | PGA/PLA | w/w | 95/5 | 95/5 | 100/0 | 95/5 | 50/50 |
| PGA Material | Mw | — | 213500 | 236400 | GL | GL/LA | GL/LA |
| | Thermal stabilizer | ppm | — | 300 | homo- | co- | co- |
| | MV retentivity | % | 45 | 81 | polymerization | polymerization | polymerization |
| PLA Material | Mw | — | 40600 | 52000 | 170° C. | 170° C. | (continuous) |
| Kneading or | Apparatus[*1] | — | LPM | LPM | 7 h | 24 h | |
| reaction | Temperature | °C. | 240 | 240 | | | |
| conditions | Time | min | 15 | 30 | | | |
| Product | Recovery rate | % | 100 | 100 | 100 | 100 | 85 |
| | Tranparence | — | clear | opaque | clear | clear | clear |
| | Coloring(YI) | — | 43 | 24 | 18 | 10 | 0 |
| | Mw | — | 48100 | 171800 | 223900 | 222300 | 221000 |
| Formability | Press | — | C | A | A | A | A |
| | Stretching | — | — | C | A | A | A |
| | Formed product | — | — | — | clear | clear | clear |
| Morphology | SEM picture | — | — | — | — | Dissolved | — |
| Crystal temp. | Tc1 | °C. | — | — | 93 | 110 | ND[*2] |
| | Tc2 | °C. | — | — | 146 | 110 | ND[*2] |
| Moist resistance | Mw retention | % | — | — | 18 | 21 | 45 |
| Gas-barrier | O$_2$ TRAN | *5 | — | — | 2.53 | 3.71 | — |

[*1]Apparatus LPM: LABO PLASTOMIL (biaxial), LT-20: Twin-screw extruder
[*2]ND: Not detectable
[*3]Slightly opaque
[*4]Somewhat opaque
*5 cc/m$^2$/day/atm (normalized at a thickness of 20 μm)

INDUSTRIAL APPLICABILITY

As understood in view of the descriptions of Examples, Comparative Examples and Reference Examples and the results shown in Table 2, it is possible to obtain a PGA-based aliphatic polyester composition by a simple process of melt-kneading polyglycolic acid (PGA) and low-molecular weight polylactic acid (PLA) in the presence of a thermal stabilizer, so that the PGA-based polyester composition can alleviate the too fast crystallizability of PGA which has been problematic in forming or molding of PGA alone or in combination with another thermoplastic resin, thus showing a crystallization speed which has been lowered and can be controlled in a wide range.

The invention claimed is:

1. An aliphatic polyester composition, comprising: a melt-kneaded product of polyglycolic acid having a weight-average molecular weight larger than 70,000 and polylactic acid having a weight-average molecular weight of at most 50,000 in a weight ratio of 99/1-50/50 in mixture with a thermal stabilizer.

2. The aliphatic polyester composition according to claim 1, wherein the composition exhibits a weight-average molecular weight of at least 70,000 as a whole.

3. The aliphatic polyester composition according to claim 1, wherein the composition exhibits a weight-average molecular weight of at least 100,000 as a whole.

4. The aliphatic polyester composition according to claim 1, wherein the polyglycolic acid and the polylactic acid are blended in a weight ratio of 99/1-80/20.

5. The aliphatic polyester composition according to claim 1, wherein the polyglycolic acid and the polylactic acid are blended in a weight ratio of 99/1-95/5, and the composition is in a completely dissolved polymer-alloy state.

6. The aliphatic polyester composition according to claim 1, showing a crystallization temperature Tc1 of at least 96° C., wherein Tc1 is defined as a peak-top temperature of a heat evolution peak accompanying a crystallization in the course of heating at a temperature-raising rate of 10° C/min. by means of a differential scanning calorimeter (DSC).

7. The aliphatic polyester composition according to claim 1, containing, per 100 wt. parts of the polyglycolic acid, 0.003-3 wt. parts of the thermal stabilizer comprising:

a phosphoric acid ester represented by formula (1) below:

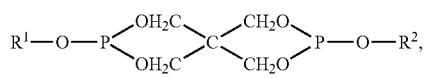
(1)

wherein $R^1$ and $R^2$ denote identical or different hydrocarbon groups selected from an aryl group having 1-3 alkyl substituents each having 1-12 carbon atoms and a long-chain alkyl group having 8-24 carbon atoms; or a phosphoric acid ester having at least one hydroxyl group and at least one long-chain alkyl group represented by formula (2) below:

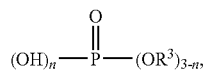
(2)

wherein $R^3$ denotes a long-chain alkyl group having 8-24 carbon atoms and n is a number giving an average of 1-2.

8. The aliphatic polyester composition according to claim 1, further containing, per 100 wt. parts of the polyglycolic acid, 0.01-10 wt. parts of a carboxyl group-capping agent selected from the group consisting of monocarbodiimides; polycarbodiimides; oxazoline compounds; oxazine compounds; and epoxy compounds.

9. A process for producing an aliphatic polyester composition, comprising: melt-kneading polyglycolic acid having a weight-average molecular weight larger than 70,000 and polylactic acid having a molecular weight of at most 50,000 in a weight ratio of 99/1-50/50 in the presence of a thermal stabilizer.

10. The production process according to claim 9, wherein the polyglycolic acid preliminarily containing the thermal stabilizer is melt-kneaded with the polylactic acid having a weight-average molecular weight of at most 50,000.

11. The production process according to claim 9, wherein the melt-kneading is performed by means of a twin-screw extruder.

12. The production process according to claim 9, wherein the thermal stabilizer comprises:

a phosphoric acid ester represented by formula (1) below:

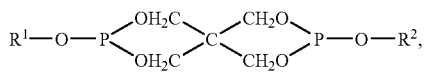
(1)

wherein $R^1$ and $R^2$ denote identical or different hydrocarbon groups selected from an aryl group having 1-3 alkyl substituents each having 1-12 carbon atoms and a long-chain alkyl group having 8-24 carbon atoms; or a phosphoric acid ester having at least one hydroxyl group and at least one long-chain alkyl group represented by formula (2) below:

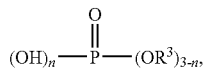
(2)

wherein $R^3$ denotes a long-chain alkyl group having 8-24 carbon atoms and n is a number giving an average of 1-2.

13. An aliphatic polyester composition according to claim 1, further containing, per 100 wt. parts of the polyglycolic acid, 0.01-10 wt. parts of a carboxyl group-capping agent selected from the group consisting of N, N-2, 6-diisopropylphenyl-carbodiimide, 2,2'-m-phenylene-bis (2-oxazoline), 2, 2'-p-phenylene-bis (2-oxazoline), 2-phenyl-2-oxazoline, styrene-isopropenyl -2-oxazoline, 2-methoxy-5, 6-dihydro-4H-1, 3-oxazine, N-glycidylphthalimide, cyclohexene oxide, and tris (2,3-epoxypropyl) isocyanurate.

\* \* \* \* \*